Jan. 3, 1967  N. E. MOHAR, SR  3,295,243
FISHING LURE RETRIEVERS
Filed Jan. 18, 1965  2 Sheets-Sheet 1
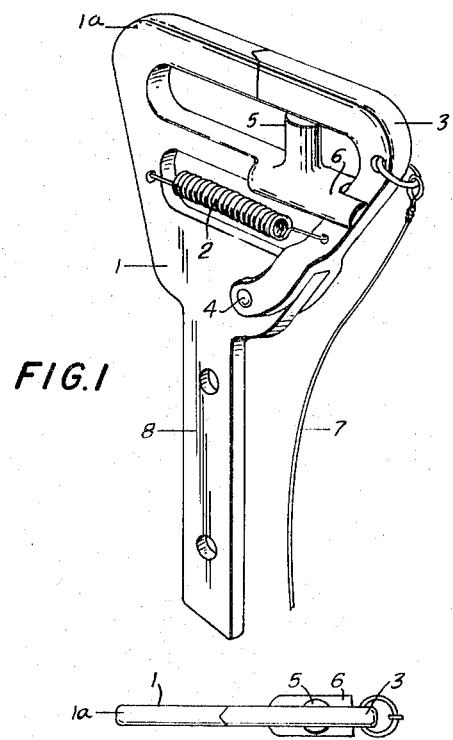
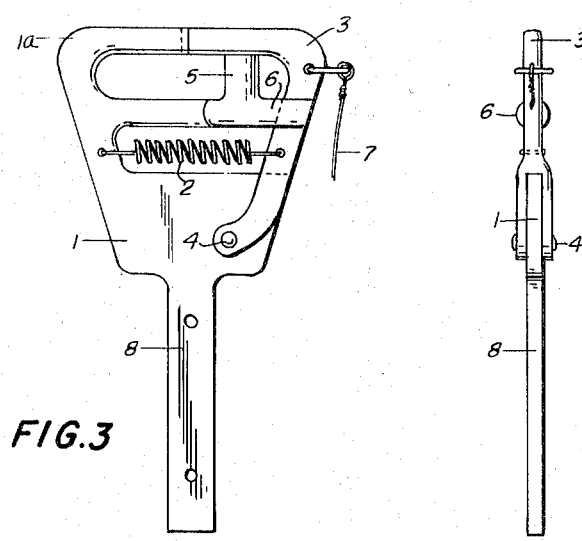
INVENTOR
NORMAN EUGENE MOHAR, SR.
BY
ATTORNEY

United States Patent Office 3,295,243
Patented Jan. 3, 1967

3,295,243
FISHING LURE RETRIEVERS
Norman Eugene Mohar, Sr., P.O. Box 865,
Jennings, La. 70546
Filed Jan. 18, 1965, Ser. No. 426,451
2 Claims. (Cl. 43—17.2)

This invention relates to retrieval of articles beyond the reach of the operator, and especially to a device to retrieve such objects as fishing hooks or lures.

Devices have been proposed that comprise some sort of hook or knife on the end of a pole to engage and cut the fishing line or leader adjacent the lure so that the line and/or leader will be salvaged even though the hook or lure is snagged, while other devices are formed merely to engage the line adjacent the hook or lure and are to be manipulated to disengage the hook or lure from the rock, or snag by which it is held. Yet other devices are alleged to grip the lure, or hook itself but such devices have been ineffective, as well as expensive and complicated.

It is an object of the present invention to provide a simple, inexpensive, easily used, and effective device by which objects, such as fishing hooks or lures may be retrieved from such inaccessible places as underwater snags or overhead branches.

Other and further objects and advantages will appear from the following specifications taken with the accompanying drawing in which like characters or reference refer to similar parts in the several views and in which:

FIGURE 1 is a perspective view of the head of the device of the present invention detached from the pole on which it is mounted in use.

Figure 5:
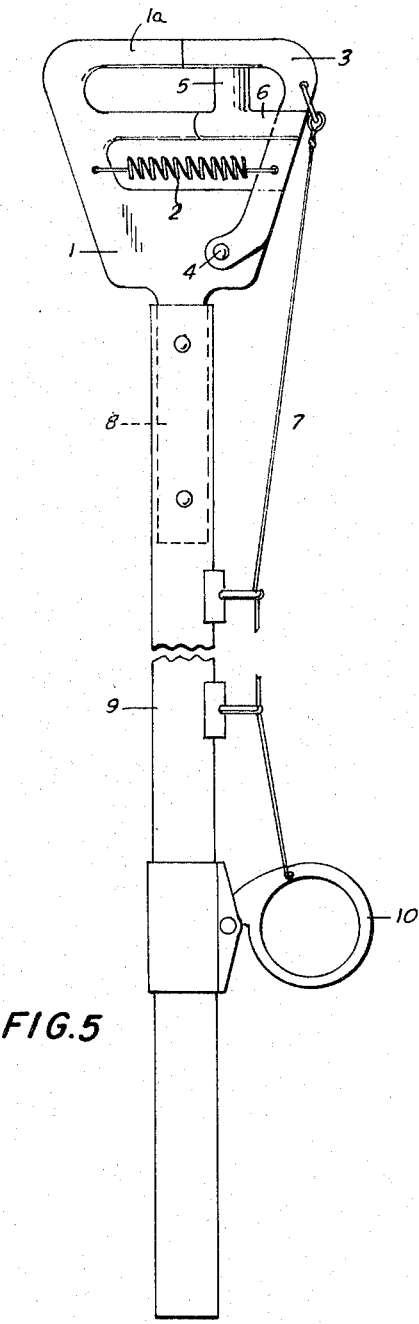
Figure 6:
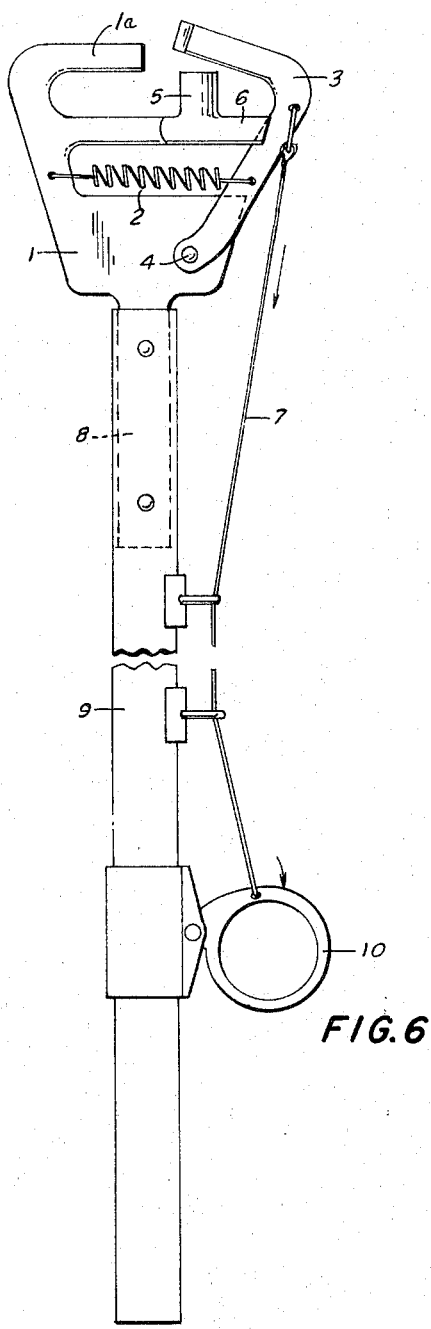

FIGURE 2 is an end view of the device of FIGURE 1.
FIGURE 3 is a side view of the device of FIGURE 1.
FIGURE 4 is an edge view of the device of FIGURE 1.
FIGURE 5 is a side view of the complete device, with the jaw closed; and
FIGURE 6 is a view similar to FIGURE 5 with the jaw open.

From FIGURES 5 and 1 we see that the entire device comprises a head 1 having a shank 8 that is secured to an elongated rod 9. The method of securing head 1 to rod 9 may be by riveting, brazing or any other conventional securement.

The manipulating head 1 is provided with a hook element 1a that forms the top edge of element 1 to form a U-shaped hook. A spring 2 is secured at one end to element 1 and at the other end to an L-shaped jaw 3 which is pivoted to element 1 at 4. The element 1 is provided between the hook element 1a and the spring 2 with an arm forming the other portion of the U-shaped hook which portion terminates beyond the end of the hook element 1a in a bifurcated end 6 to receive and guide jaw 3 to prevent its lateral displacement. A thumb 5 positioned beyond the end of hook element 1a extends upwardly from adjacent the bifurcated end 6 and forms a stop against which jaw 3 rests when closed. It will be noted that thumb 5 lies beyond the end of hook 1a and operates to prevent a fishing line, or the like that is hooked under hook 1a from moving to the right in FIGURES 1, 3, 5 and 6, which might have the effect of opening jaw 3.

Jaw 3 and hook 1a may have complementary V-shaped ends so that, when closed, accidental escape of a line hooked by hook element 1a is avoided.

A lanyard 7 is secured to jaw 3. Lanyard 7 extends along pole 9 to a fingerpiece or trigger 10 at the end of the pole remote from head 1. Suitable fair-leads may be provided on the pole to hold the lanyard 7 close to the pole to prevent entanglement of the lanyard and to avoid slackening of the tension in the lanyard especially if the pole 9 is flexed into an arc in the direction of the jaw 3.

It will be seen that holding rod or pole 9 in one hand with the index finger through finger-piece or trigger 10 it is possible to open the jaw 3 at will; and upon release of finger-piece 10 the jaw will close.

Pole or rod 9 may be a jointed rod, but it is desirable that the joints be of a type that will not be disconnected by pulling. A length of sixteen feet is suggested for rod 9.

In use, after having snagged a hook that is secured to a line from a fishing pole on a submerged object such as a sunken tree, the fishing pole would be held in the left hand and the end of pole 9 carrying head 1 would be extended into the water to reach the snagged hook. If the hook is in the direct line of the fishing line from the fishing pole, jaw 3 may be opened and the fishing line hooked by hook element 1a close to the surface of the water and the head 1 may be permitted to slide down the fishing line as it is held straight enough to guide the head directly to the hook. By permitting the head to proceed as rapidly as possible along the fishing line to the hook the hook will often be forced free by the hammerlike impact of head 1 against the hook. If, however, the impact of the head 1 against the hook does not free the hook, the head 1, with the fishing line embraced by hook 1a and jaw 3 may be pushed, pulled or twisted as required to free the hook.

If the fishing line from the snagged hook extends around a second object so that the head 1 can not proceed directly down the fishing line to the hook, it will be necessary to engage the fishing line between the snagged hook and the second object. In this case the pole 9 is extended into the water, and with jaw 3 closed, and holding the fishing line with the other hand, the head 1 is brought into proximity with the line adjacent the snagged hook. Jaw 3 is opened by pulling on lanyard 7 and the fishing line is engaged under hook 1a, the jaw 3 is closed by releasing lanyard 7, and with the fishing line within head 1, the pole 9 is manipulated by pulling, pushing and/or twisting as required to free the snagged hook.

Often in fly casting or even "bait" casting, a hook, or line may snag a twig of an overhanging tree, in which case the head 1 with jaw 3 closed is thrust up through the tree to the twig that is hooked. Jaw 3 is then opened and the twig is hooked under hook 1a, the pole 9 is then pulled and the hook or lure is stripped right out. If the twig is too large or too strong, the same procedures are followed as though the snagged hook were under water.

It will be seen that the jaw 3 cannot be opened accidentally by a fishing line, or by a twig or the like embraced by hook 1a and jaw 3, as the only direction that such an embraced object can exert a force on jaw 3 is very close to a line extending through the pivot 4 so a very heavy force will be required to pivot jaw 3 about pivot 4 if the force is applied to the extremity of jaw 3.

Thumb 5 prevents the jaw 3 from being opened by a force exerted by a line or twig within the U-shaped member pressing in the direction to the right in FIGURES 3, 5, and 6.

The flat end of the device defined by hook 1a and jaw 3, facilitates engagement of the fishing line, hook, or lure and also makes it possible, where a direct thrust of the device is all that is required to free the hook or lure, to exert such thrust without requiring careful manipulation to engage the hook or lure in the device.

Having thus disclosed my invention I claim:

1. A fishing lure retriever, or the like including a pole, a planar head mounted as an extension of one end of said pole and a finger-piece mounted near the other end of said pole, said head including a U-shaped hook portion with its legs extending transversely of the pole, and an L-shaped jaw pivoted to said head to pivot in the plane of said head from a normally closed position with its outermost leg engaging the outermost leg of the hook portion to an open position, biasing means to bias said jaw to closed position, said hook portion and said jaw having extremities that are straight and that lie, when said jaw is in its closed position, in a straight line in the plane of said head along the side of said head remote from said pole and normal to the length of said pole, said jaw being pivoted to said one end of said head adjacent the said pole, the innermost leg of said hook portion providing guard means lying parallel to the straight portion of said hook portion, a bifurcated portion on said guard means between the legs of which the innermost leg of said jaw moves, and an upstanding thumb extending from said guard means adjacent said bifurcated portion to a position to be engaged by said outermost leg of said jaw when in its closed position, and means operatively connecting said jaw to said finger-piece whereby said jaw may be manually opened by manipulation of said finger-piece.

2. In a fishing lure retriever or the like, a pole, a straight sided transversely extending U-shaped hook mounted on one end of said pole having its straight sides normal to the axis of said pole, the side of said hook closest to the pole being longer than the side of the hook remote from said pole and having a bifurcated end, a generally L-shaped jaw with a long arm and a short arm pivotally mounted adjacent the end of said pole and the short arm of said L-shaped jaw, when said jaw is in closed position, forming a linear continuation of the side of said hook remote from said pole, the other arm of said L-shaped jaw being received between and guided by said bifurcations, an upstanding thumb on said side of said hook closest to said pole at the end of the bifurcations and beyond the end of the side of said hook remote from said pole having a length such that said jaw when in closed position engages said thumb, means biasing said jaw toward closed position, and lanyard means secured to said jaw whereby said jaw may be manually opened.

References Cited by the Examiner
UNITED STATES PATENTS

| | | | |
|---|---|---|---|
| 1,726,446 | 8/1929 | McKinney. | |
| 1,851,370 | 3/1932 | Munger | 43—17.2 |
| 2,453,245 | 11/1948 | McDonald | 43—17.2 |
| 2,768,462 | 10/1956 | Younce | 43—17.2 |
| 2,828,570 | 4/1958 | Bradbury | 43—17.2 |
| 2,950,558 | 8/1960 | Karpes | 43—17.2 |

SAMUEL KOREN, *Primary Examiner.*

D. J. LEACH, *Assistant Examiner.*